United States Patent [19]
Shinopulos

[11] 3,745,296
[45] July 10, 1973

[54] COPPER TOOL MATERIAL FOR ELECTRICAL DISCHARGE MACHINING

[75] Inventor: George Shinopulos, Burlington, Mass.

[73] Assignee: Kennecott Copper Corporation, New York, N.Y.

[22] Filed: Aug. 20, 1971

[21] Appl. No.: 173,443

[52] U.S. Cl. ............... 219/69 E, 75/76, 204/143 M
[51] Int. Cl. .................... B23p 1/08, B23p 1/04
[58] Field of Search ........................ 75/72, 76, 153; 219/69 D, 69 E, 69 M, 70, 145; 252/512, 518; 313/311; 204/143 M, 292, 293; 29/624

[56] References Cited
UNITED STATES PATENTS

| | | | |
|---|---|---|---|
| 1,321,309 | 11/1919 | Holslag | 219/69 E X |
| 2,821,615 | 1/1958 | Fannon | 219/69 M |
| 3,413,435 | 11/1968 | Holtzclaw | 219/69 E |
| 3,648,013 | 3/1972 | Stayner et al. | 219/69 D |
| 3,663,787 | 6/1972 | Haswell et al. | 219/69 M X |
| 2,945,936 | 7/1960 | Carman | 219/145 X |
| 3,067,358 | 12/1962 | DeMaine | 219/69 D |
| 3,258,330 | 6/1966 | Ito et al. | 75/76 X |

OTHER PUBLICATIONS

"Engineering Alloys," Woldman & Metzler, TA490W7, 1945 C.3, Page 138.

Primary Examiner—R. F. Staubly
Attorney—John L. Sniado and Lowell H. McCarter

[57] ABSTRACT

A new electrode material for electrical discharge machining consisting essentially of copper containing a critical oxygen content is disclosed. The novel electrode shows an increase in wear resistance of up to 30 percent over presently known electrode materials and after heat treatment shows an increase of cutting speed three-fold over oxygen free copper electrodes.

7 Claims, 2 Drawing Figures

EDM CUTTING RATE VS. OXYGEN CONCENTRATION

EDM WEAR RATIO VS. OXYGEN CONCENTRATION OF Cu TOOL MATERIAL

*EDM CUTTING RATE VS. OXYGEN CONCENTRATION*

*EDM WEAR RATIO VS. OXYGEN CONCENTRATION OF Cu TOOL MATERIAL*

COPPER TOOL MATERIAL FOR ELECTRICAL DISCHARGE MACHINING

BACKGROUND OF THE INVENTION

1. Field of Invention

Electric discharge machining, hereinafter referred to as EDM, is a machining process wherein electric discharges are struck between an electrode, sometimes referred to herein as the tool, and a piece of stock comprising an electrical conductor, sometimes referred to herein as the work or workpiece. The discharges vaporize or cause a small molten pool of metal to be removed from the workpiece.

EDM processing is particularly useful in fabricating tools and dies and machining metals, particularly very hard tool steels, and/or shapes that do not lend themselves to being machined by other conventional methods in a simple and facile manner.

In spite of the advances made by EDM equipment, the overall operation is still a costly one. The prinipal item of cost is the fabrication of EDM electrode or tool. The electrode has a limited life. Depending upon the electrode tool material and upon the material being cut or machined, a single electrode can machine several pieces. For quality finish macining the EDM tool itself is fabricated, at great expense, to close tolerances.

The life of an EDM electrode has been extended by use of sintered refractory composite materials such as pressed and sintered tungsten impregnated with copper or any other suitable material normally considered to be a good electrical conductor.

The limitations of pressed and sintered EDM electrodes relate to the high cost of pressing and sintering equipment and the relatively high cost of the sintering process.

2. Prior Art

The prior art teaches, for example, in U.S. Pat. No. 2,786,128, A. H. Lines, that the tool electrode may be formed from a composite material comsisting of a matrix of copper and having approximately 15 percent graphite therein. Weglarz, U.S. Pat. No. 3,035,151, discloses a spark machining electrode and the method of making it wherein the electrode is built-up by spraying alternating layers of metal and graphite in a desired pattern. U.S. Pat. No. 3,200,231, J. N. Bejat, teaches the use of copper and molybdenum sheets for the machining of very small holes through thin metal sheets. The Herterick et al. U.S. Pat. No. 3,244,852, teaches another process for making an electrical discharge machining electrode by spraying a copper surface having a desired shape with a tungsten material and heat treating to a temperature above the melting point of the copper to cause the copper to impregnate the porous tungsten skeleton. U.S. Pat. Nos. 3,379,524; 3,413,435 and 3,585,342 disclose other electrical discharge machining electrode materials.

SUMMARY

The improved copper tool material for electrical discharge machining consists essentially of copper and from about 1,000 to about 4,000 ppm oxygen. It has also been discovered that heat treating the oxygen containing copper causes a further increase in cutting rate in copper electrode tools containing from about 1,000 up to about 3,800 ppm oxygen.

Any convenient source of copper may be used to make the EDM electrode. Copper sources may be cathode copper, electrolytic tough pitch, oxygen free copper, and certain kinds of copper scrap. The data show that minor amounts of alloying elements, normally present in all but the purest copper, such as tin, lead, nickel and sulfur do not appear to affect the cutting rate of high oxygen containing copper electrode tool material for EDM.

The EDM electrodes may be made by introducing oxygen into molten copper, casting and forming. Oxygen may be introduced into the molten copper in any convenient manner such as bubbling an oxygen containing gas such as air into the melt or exposing the surface to a cover of same until from about 1,000 parts per million to 4,000 parts per million oxygen are present in the copper. Oxygen may also be introduced into the molten copper in the form of a metallic oxide. Examples of metallic oxides that may be used include tellurium oxide, selenium oxide and copper oxide.

The high oxygen containing molten copper may be cast into the desired electrode shape or may be cast into ingot form and cold or hot formed into the EDM tool. The copper tool material may be heat treated at a temperature high enough and for a long enough period of time to cause the reduction of any copper oxide in the alloy to occur. This reaction is, of course, time and temperature dependent. However, for the purposes of this invention a temperature of from about 400° to 600° C for from about 22 to 90 hours has been found sufficient.

It has been found that there are certain inherent advantages in the use of a high oxygen containing copper electrode tool that are not obtained with an oxygen-free or low oxygen containing copper. The cutting rates using copper EDM electrodes containing about 1,000 ppm to about 4,000 ppm oxygen have been increased by a factor of from about 2 to about 6. Tool wear of this material has simultaneously been reduced by some 23 percent below that of low oxygen copper.

Other advantages that have been discovered with the use of high oxygen containing copper are that the arcing during the EDM process is much steadier and as a result the servo system does less hunting. This hunting represents a loss in cutting time and is caused by inability of the swarf (work, tool, and cracked oil materials) to clear the gap between the work and the tool thus electrically shorting the two. When a short occurs the servo mechanism moves the tool out of the gap until the short is flushed out. It has been observed that there is no caked swarf on the cut surfaces when the high oxygen tool material is used. It has also been observed that the high oxygen bearing copper, when used as an EDM electrode, generates a greater number of smaller size particles of eroded products than an oxygen-free copper tool. The smaller size eroded product particles tend to clear the gap between the tool and the workpiece more readily thus assisting in reducing the required cutting time. This may be partly due to the observation that a gap between the work and the EDM took, when using a high oxygen material, is some 5 percent wider than when a low oxygen material is used. A direct result of this appears to be an improvement in tool wear because of the better clearing of the swarf and eroded products from the area around the tool tip and thus helping to keep it cooler.

DESCRIPTION OF PREFERRED EMBODIMENTS

Figure 1:
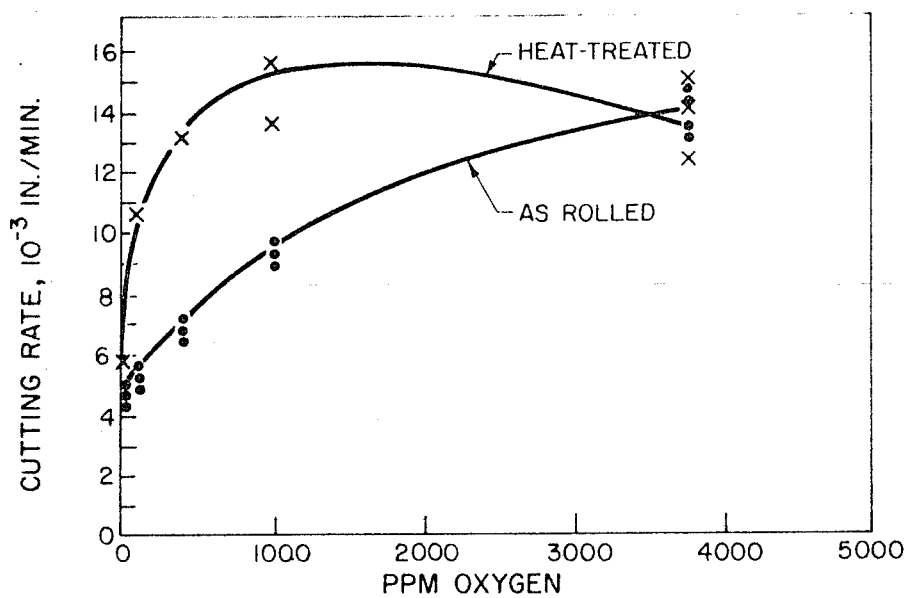
FIG. 1 is a graphical representation of the cutting rate in inches per minute versus the oxygen content of the copper electrode tool material.

In electrical discharge machining the tool (electrode) is controlled by a servo motor system at a fixed distance from the surface of the workpiece being cut. This distance, which can be preset, usually is within the 0.0005 to 0.005 inch range. Both the tool, generally the negative electrode, and the workpiece, the positive electrode, are submerged in a dielectric fluid which also functions as a coolant, and a voltage is built up between the tool and workpiece. When the potential reaches a sufficiently high level, a spark is drawn between the tool and the work, and a small molten pool of metal is ejected from the work. The cutting process is thus accomplished by repeating this arcing, as in some machines, well over 100,000 discharges per second.

Two different types of circuitry may be employed in causing the arcing. One, the relaxation circuit draws its power from discharging capacitors. The second, and more efficient, is the pulse circuit which utilizes transistors for control of spark frequency and power. The machining precision of this process approximates that of normal machine shop operations and is widely used as a production as well as a metallurgical laboratory tool.

Two particular advantages of the EDM process are that the tool does not touch the work thereby exerting any mechanical force on it and the hardness, toughness or brittleness of the work has no significant effect on the cutting process. The only requirement for performing the operation is that the cut surface must be electrically conductive. The most widely recognized disadvantage of EDM process is that the cut surface becomes a resolidifed layer of differing chemical composition containing tensile stresses and possibly resulting micro-cracks. However this surface condition is generally only a few thousandths of an inch deep and can be chemically removed.

EXAMPLES

A Servomet SMD electrical discharge machine with a 5 micron filtration system was used for experimentation. All cutting took place on setting number 4 (0.25$\mu$ F) at a gap voltage of 220 dc. The dielectric fluid used was Shell Dialla AX transformer oil and was delivered through two ¼ inch nozzles to both sides of the tool approximately one inch from the work. The 0.0082 (+0.0001; −0.0002) inch thick × 1 ½ inch wide × 2 ½ inch long electrode discharge machining tools were supported in a frame and advanced on edge into the work to make the slicing cuts. The machine was set up so the maximum run-out over ¾ inch of tool travel did not exceed ± 0.0003 inch as read by a Starret "Last-word" indicator.

The work was made up of various lengths of ETP copper bar 0.375 inches thick × 0.415 inches wide, which were supported at one end in a small vise, which in turn was mounted on a jeweler's lathe so that the work could be advanced into position for the subsequent slice or cut. As noted below, some experiments were performed using ¼ × ¼ inch case hardened steel key stock as the workpiece. The workpieces themselves were weighted in a C-clamp fastened to the slice close to the cut. By weighting the slice the sparking then took place at the tool edge along the base of the cut and not on the side of the slice.

In order to eliminate the more likely impurity elements, usually found in copper alloys as possible factors in effecting the cutting rate, an alloy was cast in a base of 5N (99.999 percent purity copper and rolled along with an unalloyed control sample of the same pure copper into 0.008 inch thick tool material. The alloy, Alloy C, contained 25 ppm tin, 80 ppm lead, 25 ppm nickel and 50 ppm sulfur and the balance copper. The cutting rate, the time to cut through the 0.375 inch dimension of the 0.415 inch wide copper bar, was 5.3 × $10^{-3}$ inch/min for alloy C electrode against 5.2 × $10^{-3}$ inch/min for the pure copper control electrode. Thus alloying elements other than oxygen appear to have no effect on the cutting rate.

The cutting rates of high oxygen containing copper electrode tools were compared with several commonly used electrode tool materials. These materials are shown in Table I. ETP copper is electrolytic tough pitch copper containing at least 99.90 percent copper and a nominal oxygen content of 0.04 percent. Oxygen free copper contains less than 10 ppm oxygen. Based on the cutting rate of the materials tested, the copper tungsten alloy is the only competitor to the electrode materials disclosed herein. The cutting rate is taken as the time to cut through the 0.375 inch dimension of the 0.415 wide copper bar. The wear ratio is the ratio of the work cut depth (.0375 inch) to the end wear of the tool due to spark erosion. Comparison of the various tool materials with their respective cutting rates and wear ratio are presented in Table I.

TABLE I

Comparison of Tool Materials

| Material | Cutting Rate $10^{-3}$ in/min | Wear Ratio, lengths eroded, work/tool |
|---|---|---|
| 1000 ppm O$_2$ Cu, heat treated | 15.5 | 0.9 |
| 3000 ppm O$_2$ Cu, as rolled | 14.2 | 1.3 |
| 30% Copper/70% Tungsten | 15.4 | 4.4 |
| Tantalum | 9.4 | 6.2 |
| Brass | 8.3 | 0.5 |
| Molybdenum | 7.5 | 1.0 |
| ETP Copper | 5.5-7.0 | 1.1 |
| Oxygen Free Copper | 5.2 | 0.95 |
| (1)Tungsten - 0.10 inch thick | 3.2 | 2.6 |
| (2)1.76 g/cc graphite | 2.4 | 0.02 |
| 1.76 g/cc graphite-.020 inch thick | 1.5 | 0.7 |
| (1)Tungsten - 0.0055 inch thick | 1.0 | 0.3 |

(1)Tungsten blades flaked as if delaminating at cutting edge.
(2)Graphite blade broke into approx. 1/32 inch pieces along cutting edge.

Oxygen reduction heat treatments of high oxygen containing copper for tool fabrication was performed in a vacuum tight Inconel alloy 600 muffle tube furnace, electrically heated, using an argon plus 4 percent hydrogen atmosphere at 5 psig, and a flow rate of approximately 50 ml/min discharging through an oil filled bubble bottle. The copper tool material was heat treated when approximately 0.013 inch thick and subsequently rolled to a final tool thickness of 0.008 inch.

Table II below reports the analysis of the various copper alloys used in the tool materials.

TABLE II
[Copper analyses (p.p.m. by weight)]

| Material | Sn | Pb | Bi | Ni | Sb | Fe | Te | As | Ag (oz./ton) | S | O₂ |
|---|---|---|---|---|---|---|---|---|---|---|---|
| O₂ free | 1 | 1.5 | 0.2 | 9.2 | 11 | 6 | <2 | <2 | 0.35 | | [1]10 |
| ETP-1 | | | | | | | | | | | [2]100 |
| ETP-2 | 1 | 1.5 | <0.2 | 9.6 | 4 | 7 | <2 | <2 | 0.22 | | [1]400 |
| Alloy A | 25 | 62 | 0.3 | 24 | 16 | 8 | <2 | <2 | 0.43 | ([3]) | [4]1,007 |
| Alloy B | 6.6 | 50 | 0.2 | 10 | 6.6 | 10 | <2 | <2 | 0.33 | ([3]) | [4]1,007 |
| Alloy C [5] | 25 | 80 | | 25 | | | | | | 50 | |
| Alloy D | | | | | | | | | | | [4]3,800 |
| Alloy E | 3.7 | 35 | 0.2 | 5 | 12 | 10 | <2 | <2 | | | [4]3,800 |

[1] Not measured; maximum commercial limit.
[2] Estimated metallographically.
[3] Reported as high.
[4] Measured by neutron activation.
[5] Cast composition.

Figure 2:
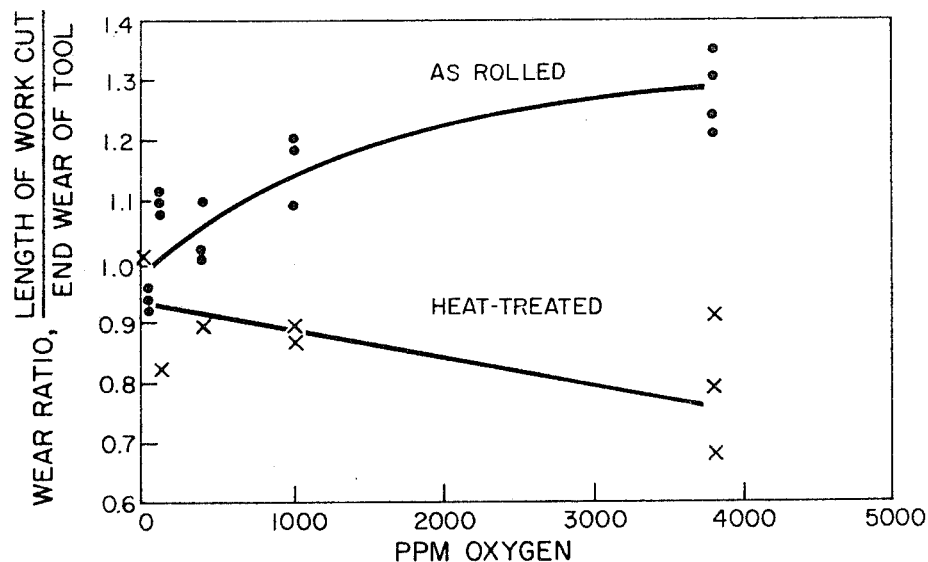
FIG. 2 shows the wear ratio of the electrode discharge machine tool versus the oxygen concentration of the tool material for heat-treated and as rolled tool material.

In order to directly ascertain the affect of oxygen, two high oxygen alloys, identified in Table II above as Alloy D and Alloy E, were cast in a pure copper base of materials from different sources and different melting techniques. The oxygen was introduced into molten copper as copper oxide powder in both cases. The cast alloy scructures were worked by cold rolling and annealing in air at 450° C. The material was then fabricated into EDM electrodes of the size specified above, i.e., 0.008 inches thick by 1 ½ inches wide by 2 ½ inches long. Some of the electrodes were fabricated as rolled and some were heat treated as described above. The resulting data, as shown in FIG. 1, indicates that increasing oxygen content of copper electrode tool material increases the cutting rate for both the as rolled EDM electrodes and the heat treated EDM electrodes. FIG. 2 illustrates the improvement in wear ratio with higher oxygen concentration for the as rolled materials.

A few tests were performed, using a length of ¼ × ¼ inch square case hardened steel key stock as the work, to validate that the discovered high oxygen containing copper electrode was effective in cutting materials other than copper. Steel was chosen because a large amount of commercial EDM cutting is on such material. Table III lists the results and, as can be seen, for 0.008 inch thick tool the increased cutting rate of high oxygen material, unlike with the copper workpiece, far outstrips that of the copper tungsten tool — in this case a factor of 6.4. Tool wear, however, still remains approximately 3.2 times that of copper tungsten material.

TABLE III

Tool Characteristics for ¼ × ¼ inch case hardened steel workpiece.

Tool Thickness - 0.008 Inch

|  | 30% Copper/ 70% Tungsten | Oxygen Free Cu | Alloy A Heat Treated |
|---|---|---|---|
| Cutting Rate, 10⁻³ in/min | 4.8 | 5.2 | 30.7 |
| Wear Ratio | 5.0 | 1.25 | 1.6 |

Tool Thickness - 0.047 Inch

|  | Oxygen Free Cu | Alloy D |
|---|---|---|
| Cutting Rate, 10⁻³ in/min | 3.6 | 6.8 |
| Wear Ratio | 3.6 | 4.2 |

It will be understood that the claims are intended to cover all changes and modifications of the examples of the invention herein chosen for the purposes of illustration, which do not constitute departures from the spirit and scope of the invention.

I claim:

1. An electrical discharge machining tool consisting essentially of copper and containing from at least about 1,000 parts per million oxygen up to about 4,000 parts per million oxygen, said oxygen being chemically combined as copper oxide uniformly dispersed in said electrical discharge machining tool.

2. The electrical discharge machining tool of claim 1 wherein said tool has been heat treated in a reducing atmosphere at a temperature and time sufficient to reduce any copper oxide present in said tool.

3. The electrical discharge machining tool of claim 2 wherein the heat treatment was at about 500° C for from about 22 to about 90 hours.

4. An electrical discharge machining electrode consisting of at least 1000 parts per million oxygen up to about 400 parts per million oxygen, said oxygen being chemically combined as copper oxide uniformly dispersed in said electrical discharge machining tool and the balance essentially copper, said electrode being made by a process comprising the steps of introducing oxygen into molten copper in a quantity such that said electrode contains from about 1,000 to about 4,000 parts per million oxygen, casting the said electrode, and shaping said cast electrode to the desired configuration.

5. The electrode of claim 4 wherein the oxygen is introduced into the molten copper as copper oxide powder.

6. The electrode of claim 4 including the step of heat treating said electrode in a reducing atmosphere at a temperature of about 500° C for from about 22 to about 90 hours.

7. In an apparatus for electrical discharge machining, an electrode of improved cutting rate and wear performance consisting essentially of copper containing from about 1,000 to about 4,000 parts per million oxygen, said oxygen being chemically combined as copper oxide uniformly dispersed in said electrical discharge machining tool.

* * * * *